United States Patent
Murakami et al.

(10) Patent No.: US 7,762,154 B2
(45) Date of Patent: Jul. 27, 2010

(54) SYNCHROMESH AUTOMATIC TRANSMISSION

(75) Inventors: Tsuyoshi Murakami, Handa (JP); Hiroki Yamaura, Okazaki (JP); Katsuhiro Komori, Okazaki (JP); Koji Matsumoto, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 323 days.

(21) Appl. No.: 12/073,026

(22) Filed: Feb. 28, 2008

(65) Prior Publication Data

US 2008/0210034 A1 Sep. 4, 2008

(30) Foreign Application Priority Data

Mar. 1, 2007 (JP) .............................. 2007-051761

(51) Int. Cl.
*F16H 3/08* (2006.01)
*G05G 5/00* (2006.01)
*G05G 5/08* (2006.01)

(52) U.S. Cl. ..................... 74/331; 74/473.23; 74/473.24

(58) Field of Classification Search ........................ None
See application file for complete search history.

(56) References Cited

FOREIGN PATENT DOCUMENTS

| EP | 1 607 661 A2 | 12/2005 |
|----|--------------|---------|
| FR | 2 860 567 A1 | 4/2005 |
| JP | 45-18883 | 6/1970 |
| JP | 53-18473 | 2/1978 |
| JP | 2-42276 A | 2/1990 |
| JP | 8-178066 A | 7/1996 |
| JP | 11-280901 A | 10/1999 |
| JP | 2004-518918 A | 6/2004 |
| JP | 2006-2789 A | 1/2006 |
| WO | WO-02/066870 A1 | 8/2002 |

*Primary Examiner*—Dirk Wright
(74) *Attorney, Agent, or Firm*—Birch, Stewart, Kolasch & Birch, LLP (57) ABSTRACT

A synchromesh automatic transmission includes a lug lock portion which is engaged with a shift lug separately from a shift finger and enables a shift fork to be controlled so as to be located at a neutral position, a shift selector mechanism which achieves a target shift stage by engaging the shift finger with the shift lug of the shift fork corresponding to the target shift stage and displacing this shift fork in a shift direction, and an interlock mechanism which controls a shift fork that is different from the target shift stage so as to be located at a neutral position by displacing the lug lock portion following movement of the shift finger in a selection direction and engaging this lug lock portion with the shift lug of the shift fork that is different from the target shift stage.

9 Claims, 11 Drawing Sheets

First speed → third speed

FIG. 11A

First speed → third speed

FIG. 11B

First speed → third speed

FIG. 11C

Second speed → fourth speed

FIG. 12A

Second speed → fourth speed

FIG. 12B

Second speed → fourth speed

FIG. 12C

Second speed → fourth speed

SYNCHROMESH AUTOMATIC TRANSMISSION

CROSS-REFERENCE TO RELATED APPLICATIONS

This application is based upon and claims the benefit of priority from prior Japanese Patent Application No. 2007-051761, filed Mar. 1, 2007, the entire contents of which are incorporated herein by reference.

BACKGROUND OF THE INVENTION

1. Field of the Invention

The present invention relates to a synchromesh automatic transmission for selecting a shift lug of a target shift stage from a plurality of shift lugs aligned in a row and displacing the shift lug in a shift direction by a shift finger.

2. Description of the Related Art

An automatic transmission of a vehicle (car) has a structure to carry out transmission of a target shift stage by using a synchromesh.

In such a synchromesh automatic transmission, a structure is used in which a shift lug is provided to a plurality of shift forks for carrying out gear change of various shift stages, respectively, and by using a shift finger, only one shift lug corresponding to a target shift stage is selected from among shift lugs so as to displace the shift lug in a shift direction. In many cases, by providing a selector shaft, which can be displaced in the same direction as the direction of a row of shift lugs (namely, a direction to select the shift lug) and in a direction to shift the shift lug, a shift selector mechanism having a shift finger provided to this selector shaft is used. By selectively engaging the shift finger with one shift lug, namely, engaging the shift finger with the shift lug of the shift fork corresponding to the target shift stage by a motion in a selection direction of the selector shaft, and by displacing the selected shift lug in a shift direction by a motion in a shift direction of the selector shaft, shift of the target shift stage is achieved.

In such an automatic transmission, during selection of the shift lug of the target shift stage, in order to prevent transmission of a power through a shift stage that is different from the target shift stage, by using an interlock mechanism, the shift other than the target shift stage is prevented although the shift of the target shift stage can be carried out (in order to achieve the shift transmission of the target shift stage).

According to such an interlock mechanism, as shown in FIGS. 2 and 20 of Jpn. PCT National Publication No. 2004-518918, by assembling an interlock cam and an interlock plate in a selector shaft itself which displaces a shift finger in a shift direction and selecting a shift lug of a target shift stage, the interlock cam and the interlock plate are engaged with the shift lug of the shift stage other than the target shift stage, and the shift fork of the shift stage other than the target shift stage is controlled so as to be located at a neutral position. This kind of technique is disclosed in Jpn. PCT National Publication No. 2004-518918.

The structure to provide the interlock cam and the interlock plate on the selector shaft for displacing the shift lug to the shift position as described above is required to engage the interlock cam and the interlock plate with a shift lug of a shift stage other than the target shift stage in consideration of movement of the shift finger in a shift direction.

In order to achieve this engagement, a very high degree of accuracy is required. Therefore, in the above-described structure, the interlock cam and the interlock plate may be arranged at a position deviated from the shift lug to be engaged due to an error of each part or the like, and according to the circumstances, it is feared that the shift fork cannot be controlled so as to be located at the neutral position. Further, the circumstances to control the shift lug in the interlock cam and the interlock plate are changed due to movement of the shift finger in the shift direction. Therefore, this structure has a problem that, if the movement of the shift lug in the shift direction is changed, for example, for each kind of transmission, a structure to enable movement in the shift direction is required for each transmission and thus it is difficult to cope with each kind of transmission.

BRIEF SUMMARY OF THE INVENTION

An object of the present invention is to provide a synchromesh automatic transmission, which can control a shift fork of a shift stage different from a target shift stage, upon shift of the target shift stage, so as to be located at a neutral position without being influenced by movement of a shift finger of the target shift stage in a shift direction.

The synchromesh automatic transmission according to the present invention employs a structure to provide an interlock mechanism for controlling a shift fork different from a target shift stage so as to be located at a neutral position by having a lug lock portion that can control the shift fork at a neutral position being engaged with the shift lug other than the shift finger, displacing this lug block part following the movement of the shift finger in the selection direction, and engaging this lug block part with the shift lug of the shift fork of the shift stage different from the target shift stage, in addition to a shift selector mechanism to achieve a target shift stage by engaging the shift finger with the shift lug of the shift fork corresponding to the target shift stage and displacing this shift fork in the shift direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, a first embodiment according to the present invention will be described on the basis of FIGS. 1 to 12.

Figure 1:
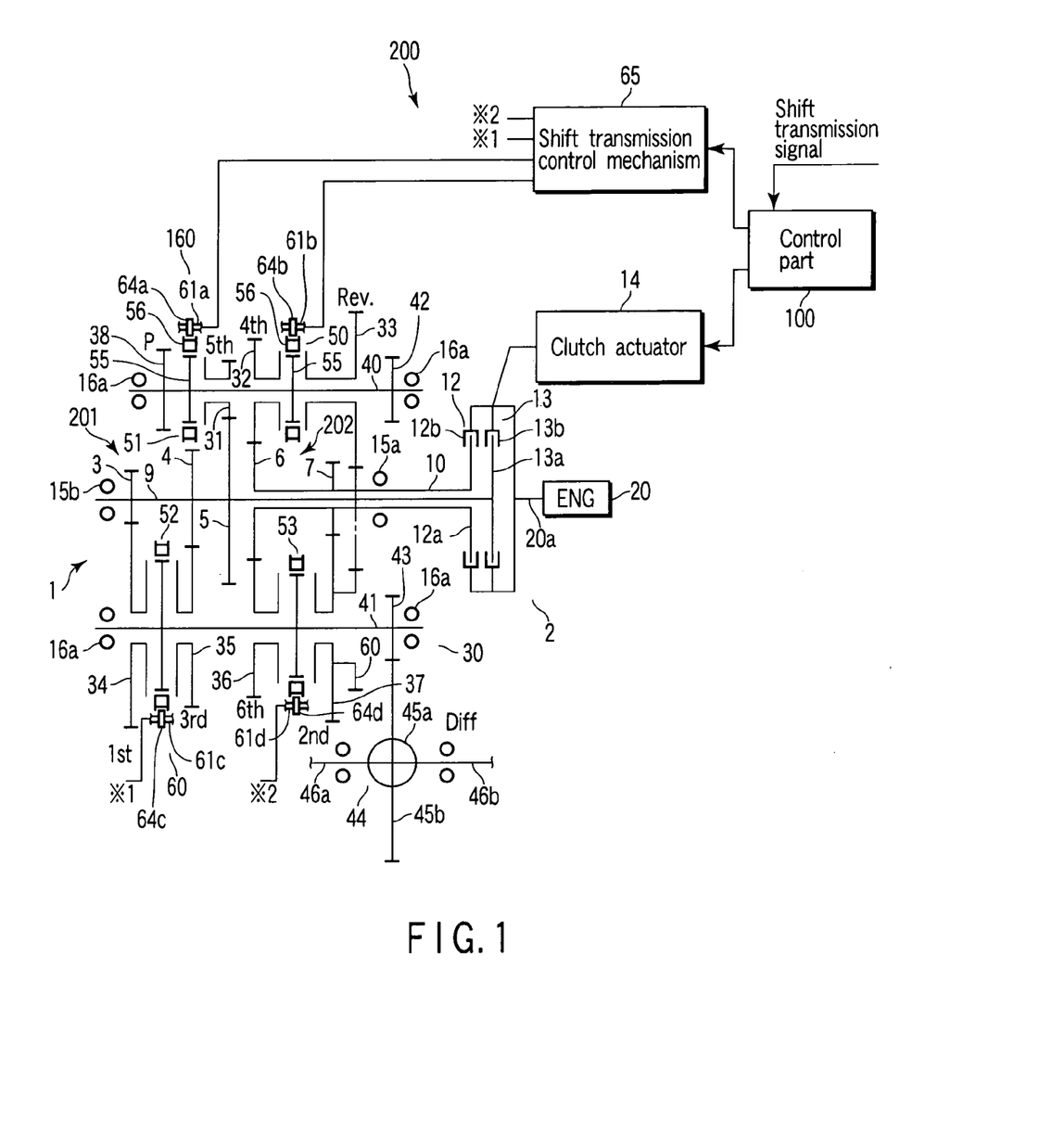
FIG. 1 is a schematic diagram of an automatic transmission according to a first embodiment of the present invention.

FIG. 1 shows a schematic structure of an automatic transmission of a vehicle (car), for example, a synchromesh automatic transmission 200 using a twin clutch having a shift stage of a total of seven gear speed shifts, i.e., a front stage having six gear speed shifts and a rear stage having one gear speed shift. In FIG. 1, reference numeral 1 denotes a twin clutch transmission mechanism. The twin clutch transmission mechanism 1 is formed by combining an input system 2 and an output system 30. The input system 2 uses the structure in which two (plural) input shafts 9 and 10 on which plural driving gears 3 to 7 are arranged and two (plural) sets of clutches 12 and 13 are combined. The output system 30 uses the structure having two output shafts 40 and 41, on which driven gears 31 to 37 and synchronous mechanisms 50 to 53 are arranged.

The input system 2 will be specifically explained. As the input shaft 9, a shaft member is used, and as the input shaft 10, a tubular shaft member is used. The input shaft 10 is rotatably fitted and inserted on an outer periphery face of the input shaft 9 so as to cover about the half region on the side of a base portion of the input shaft 9. Then, a middle portion of a double shaft portion is supported by a bearing 15a. In addition, the end portion of the input shaft 9 projecting from the input shaft 10 is supported by a bearing 15b, by which the input shaft 9 is rotatably supported, and at the same time, the input shaft 10 is rotatably supported around a shaft core of the input shaft 9. The end portion of the input shaft 9 on the side of the double shaft portion is coupled with a dry type clutch 13, specifically, coupled with a clutch plate 13a (the clutch 13), for example. In the same way, the end portion of the input shaft 10 is coupled with a clutch 12, specifically, coupled with a clutch plate 12a (the clutch 12). On an output shaft 20a of an engine 20, two sets of pusher plates 12b and 13b are provided. Then, by closely contacting the pusher plate 13b with the clutch plate 13a, a rotational force to be output from the engine 20 is transmitted to the input shaft 9, and in addition, by closely contacting the pusher plate 12b with the clutch plate 12a, the rotational force to be output from the engine 20 is transmitted to the input shaft 10. In other words, by the clutches 12 and 13, the rotational force of the engine 20 is alternatively transmitted to the input shaft 9 or the input shaft 10. Further, in FIG. 1, reference numeral 14 denotes a clutch actuator for regularly operating the clutches 12 and 13.

The driving gears 3 to 7 are divided into predetermined two shift stage groups to be provided on the input shafts 9 and 10.

Specifically, a front stage (first to sixth gear speeds) is divided into shift stage groups 201 and 202 including the even number shift stages and the odd number shift stages, and among them, the driving gears 3 to 5 corresponding to the odd number shift stage group 201 are provided on the input shaft 9. Specifically, the driving gears of the odd number shift stage group 201 are provided from the side of the bearing 15*b* on the shaft portion (the input shaft 9) projecting from the input shaft 10 in the order of the driving gear 3 for the first gear speed, the driving gear 4 for the third gear speed, and the driving gear 5 for the fifth gear speed. The driving gears corresponding to the even number shift stage group 202 are provided on the input shaft 10. Specifically, the driving gears of the even number shift stage group 202 are provided from the side of the driving gear 5 on the input shaft 10 in the order of the driving gear 6 for the fourth gear speed and the sixth gear speed and the driving gear 7 for the second gear speed. Thereby, if the clutch 13 is connected to the input shaft 10, the rotational force of the engine 20 is transmitted to the driving gears 3 to 5 of the odd number stage, and if the clutch 12 is connected to the input shaft 10, the rotational force of the engine 20 is transmitted to the driving gears 6 and 7 of the even number stage.

The output system 30 will be described. The output shafts 40 and 41 are both arranged side by side with the input shafts 9 and 10. Then, the opposite end portions of each shaft are rotatably supported by bearings 16*a*. On the end portions of the output shafts 40 and 41 on the sides of the clutches 12 and 13, output gears 42 and 43 are provided, respectively. These output gears 42 and 43 are meshed with a differential mechanism 44. Specifically, the differential mechanism 44 is configured, for example, having a differential gear portion 45*a* formed by combination of pinion gears (not illustrated), a ring gear 45*b* (reduction gear) for inputting a rotation in this differential gear portion 45*a*, and shaft portions 46*a* and 46*b* for transmitting the rotational force distributed by the differential gear portion 45*a* to right and left driving wheels (not illustrated) of a vehicle. The output gears 42 and 43 are meshed with the ring gear 45*b* of this differential mechanism 44.

The driven gears 31 to 36 are distributed to the output shafts 40 and 41 with the number of the shift stages on the side of the output shaft 40 being smaller than that on the side of the output shaft 41. Specifically, on the outer periphery face of the output shaft 40, the driven gear 31 for the fifth gear speed to be meshed with the driving gear 5, the driven gear 32 for the forth gear speed to be meshed with the driving gear 6, and the driven gear 33 for the reverse gear are rotatably arranged. On the outer periphery face of the output shaft 41, the driven gear 34 for the first gear speed to be meshed with the driving gear 3, the driven gear 35 for the third gear speed to be meshed with the driving gear 4, the driven gear 36 for the sixth gear speed to be meshed with the driving gear 6, and the driven gear 37 for the second gear speed to be meshed with the driving gear 7 are rotatably arranged. Further, on the end portion of the output shaft 40, a parking gear 38 is arranged.

The synchronous mechanisms 50 to 53 are distributed to the output shafts 40 and 41 according to layouts of these driven gears 31 to 37. Specifically, in the output shaft 40, the synchronous mechanism 50 for selecting the fourth gear speed and the reverse gear, of which the shift direction is a bidirectional type, is arranged on the shaft portion between the driven gear 32 (for the fourth gear speed) and the driven gear 33 (for the reverse gear). Further, on the shaft portion on the side of the bearings 16*a* sandwiching the driven gear 31 (for the fifth gear speed) of this output shaft 40, the synchronous mechanism 51 for selecting the fifth gear speed, of which the shift direction is a unidirectional type, is arranged.

In addition, in the output shaft 41, the synchronous mechanism 52 for selecting the first and third gear speeds, of which shift direction is a bidirectional type, is arranged on the shaft portion between the driven gear 34 (for the first gear speed) and the driven gear 35 (for the third gear speed), and the synchronous mechanism 53 for selecting the sixth and second gear speeds, of which the shift direction is a bidirectional type, is arranged on the shaft portion between the driven gear 36 (for the sixth gear speed) and the driven gear 37 (for the second gear speed).

Among these synchronous mechanisms 50 to 53, any of the bidirectional type synchronous mechanisms 50, 52, and 53 uses the structure in which a synchronizer hub 55 is arranged on the shaft portion, a synchronizer sleeve 56 is slidably assembled on the outer peripheral part of this hub 55 in the axial direction, and on respective gears on the opposite sides of the this hub 55, a pair of synchronizer cones (not illustrated) and a pair of synchronizer rings (not illustrated) are provided (a reference mark is shown in the synchronous mechanisms 50 and 52). Thereby, if the synchronizer sleeve 56 is slid in any direction among the axial directions, the synchronizer rings are brought into contact with the synchronizer cones, and through friction, the output shafts 40 and 41 are engaged with the driven gears of respective shift stages while reducing a difference in rate of rotation (the synchromesh). The unidirectional type synchronous mechanism 51 uses the structure in which the synchronizer rings and the synchronizer cones only on one side are omitted from the bidirectional type synchronous mechanisms 50 and 52, and one direction separated from the bearing 16*a* is made into a shift direction. In other words, when the synchronizer sleeve 56 is slid to the driven gear 31, in the same way, the output shaft 40 and the driven gear 31 for the fifth gear speed are engaged with each other while reducing the difference in rate of rotation by the friction. In addition, on the side part of the opposite of the synchronous mechanisms 53 in the driven gear 37 (for the second gear speed), an idler gear 60 for reverse is concentrically attached. This idler gear 60 is meshed with the driven gear 33 for reverse of the output shaft 40. If the driven gear 33 for reverse is engaged with the output shaft 40 by the synchronous mechanism 50, the output of inverse rotation, which is decelerated at a reduction gear ratio of the second gear speed shift stage, a reduction gear ratio of the reverse speed stage, and further, a final reduction ratio of the rotational shaft 40, is transmitted to the differential mechanism 44.

Figure 2:
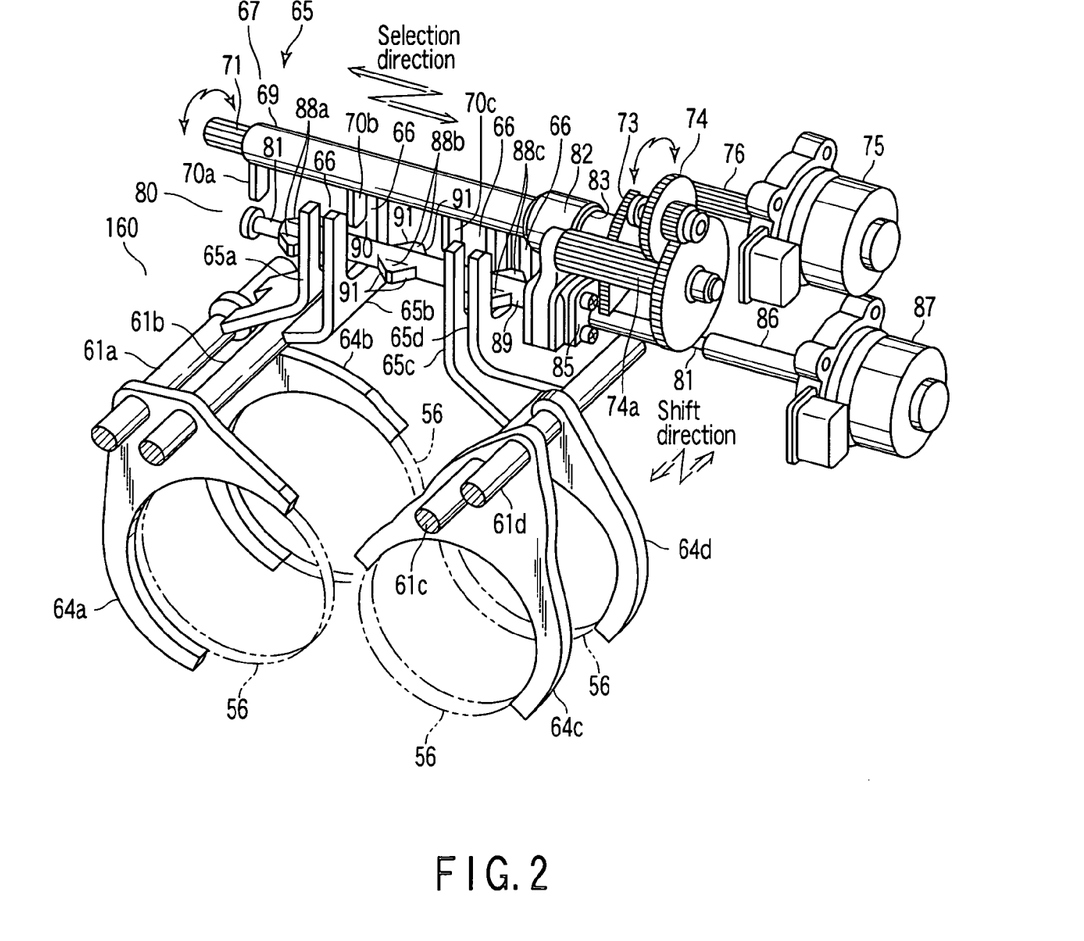
FIG. 2 is a perspective view showing a structure of a shift transmission control mechanism of the automatic transmission.
Figure 3:
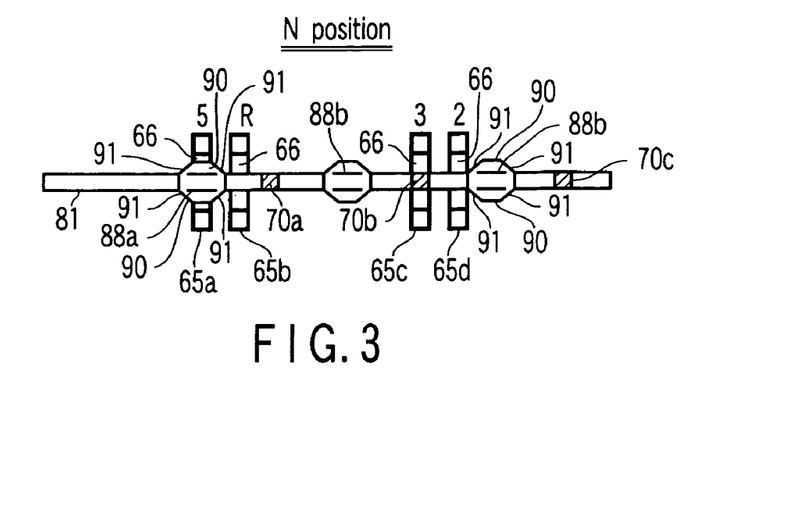
FIG. 3 is a view schematically showing the shift transmission control mechanism located at an N position.

A selecting portion 160 is assembled with these synchronous mechanisms 50 to 53. As shown in FIG. 2, the selectselectoring portion 60 has shift rails 61*a* and 61*b* that are arranged movably along an axial core direction of the synchronizer sleeve 56 around the synchronous mechanisms 50 and 51; shift rails 61*c* and 61*d* that are arranged movably along an axial core direction of the synchronizer sleeve 56 around the synchronous mechanisms 52 and 53; shift forks 64*a* and 64*b* for change of a shift stage that are arranged on the shift rails 61*a* and 61*b*; shift forks 64*c* and 64*d* for change of a shift stage that are arranged on the shift rails 61*c* and 61*d*; and shift lugs 65*a* to 65*d* that are arranged on the shift rails 61*a* to 61*d*, respectively. That is, the shift lugs 65*a* to 65*d* are provided in order to drive the shift forks 64*a* to 64*d* respectively via the shift rails 61*a* to 61*d*. Among them, the shift forks 64*a* and 64*b* are engaged with groove portions (not illustrated) formed on the outer peripheral portion of the synchronizer sleeve 56 (the synchronous mechanisms 51 and 56) on the output shaft 40; the shift forks 64*c* and 64*d* are engaged with the synchronizer sleeve 56 (the synchronous mechanisms 52 and 53) on the output shaft 41; and if the shift forks 64a to 64d are displaced in the axial direction, the shift stage is changed. In addition, any of the shift lugs 65a to 65d for each of the shift forks 64a to 64d is formed by a band-shaped member having a groove portion 66 at the front end thereof, the band-shaped member being extended in a direction away from the shift rails 61a to 61d, for example, as shown in FIG. 2. These shift lugs 65a to 65d are aligned in series in a direction perpendicular to the axial cores of the output shafts 40 and 41 in a state so that the groove portions 66 are facing each other.

Then, by means of a shift transmission control mechanism 65 to be assembled with the selecting portion 160, the shift lug corresponding to the target shift stage is selected from among the shift lugs 65a to 65d to be shifted. As the shift transmission control mechanism 65, the structure divided based on a function, namely, the structure divided into a shift selector mechanism 67 for achieving a shift transmission of the target shift stage and an interlock mechanism 80 for avoiding shift of the shift stage different from the target shift stage is used.

The shift selector mechanism 67 uses a structure in which a pipe-shaped selector shaft 69 is arranged just above the shift lugs 65a to 65d, for example. In other words, on the lower part of the outer peripheral face of the selector shaft 69, plural, for example, three shift fingers 70a to 70c are provided. These shift fingers 70a to 70c are arranged at predetermined positions and any of them is formed by a downward project piece member having an outline that can pass through the groove portions 66 of the shift lugs 65a to 65d. The selector shaft 69 is supported by a support portion, for example, a shaft 71 so as to be displaceable in the axial core direction and in the rotation direction. Specifically, the shaft 71 passes through the inside of the selector shaft 69 with the front end portion rotatably supported by the bearing portion (not illustrated). A hole portion of the selector shaft 69 through which the shaft 71 passes is a hollow hole, and thereby, the selector shaft 69 can be slidably displaced in the axial core direction using the shaft 71 as a guide and further, the selector shaft 69 can be rotatably displaced using the axial core of the shaft 71 as a support point.

Then, one end portion of the selector shaft 69 is connected to a motor for shift 75, specifically, is meshed with a pinion gear 76 fitted to a motor output shaft, via a reduction gear portion 74 which is composed by combining gear trains, for example, a fan gear 73 arranged on the shaft end and small and large reduction gears. Thereby, if the motor for shift 75 is operated, shift fingers 71a to 71c are rotatably displaced from the neutral position to each shift position.

In addition, around the shift fingers 70a to 70c, for example, just below the selector shaft 69, a ball screw shaft 81 (corresponding to an interlock shaft of the present application) is arranged. The ball screw shaft 81 passes through the groove portions 66 of the respective shift lugs 65a to 65c while being located along the line of the shift lugs 65a to 65d. Then, the space between the end portion on the side of the motor of the selector shaft 69 and the ball screw shaft 81 just below this end portion is joined by an arm-shaped joint member 82. Specifically, the upper end portion of the joint member 82 is rotatably coupled with the end portion of the selector shaft 69 via a bearing 83, and the lower end portion thereof is meshed with the screw portion of the ball screw shaft 81 so as to be capable of moving forward and backward via a ball bearing portion 85 assembled with the lower end portion. The base end portion of the ball screw shaft 81 is coupled with the output portion of a motor for selection 87 via a screw shaft holder portion 86. If the motor for selection 87 is operated, the joint member 82 moves forward and backward on the ball screw shaft 81 and the selector shaft 69 is displaced on the shaft 71. Thereby, if the selector shaft 69 is displaced in a selection direction, one of the shift fingers 70a to 70c can be selectively engaged with one of the shift lugs 65a to 65d. Further, in order to establish slidable displacement of the shift fingers 70a to 70c, as a reduction gear 74a to be meshed with the fan gear 73, a spur gear of an axial length extended for the amount of the slidable displacement, is used.

In other words, the shift selector mechanism 67 is configured in such a manner that it engages any of the shift fingers 70a to 70c with the shift lug corresponding to the target shift stage by the operations of the motor for selection 87 and the motor for shift 75, and then, by displacing that shift finger in a shift direction of the selected shift fork, the shift of the target shift stage is achieved.

On the other hand, the interlock mechanism 80 uses a structure in which, for example, three (plural) lug lock portions 88a to 88c for controlling a neutral position are arranged on the outer peripheral face of the ball screw shaft 81 passing through the groove portion 66. Based on this structure, engaging the lug lock portions 88a to 88c with the shift lugs 65a to 65d separately from the shift fingers 70a to 70c, the shift forks 64a to 64d of these shift lugs 65a to 65d are to be controlled at the neutral position. Specifically, for example, there is used a structure in which a pipe-shaped lug lock holding member 89 is slidably (capable of moving both in the rotational direction and the axial direction) fitted and inserted on the outer peripheral face of the ball screw shaft 81; the above-mentioned lug lock portions 88a to 88c are arranged at predetermined positions of the outer peripheral face of the lug lock holding member 89; and this lug lock holding member 89 is coupled to the joint member 82. When the shift finger selects the shift lug of the target shift stage, any of the lug lock portions 88a to 88c is arranged on the position (namely, the neutral position) to stop within the shift lug of another shift stage of the same shift stage group, for example. Based on this structure, the lug lock portions 88a to 88c are engaged with the shift lug of the shift fork different from the target shift stage due to displacement following movement of the shift fingers 70a to 70c in the selection directions, thereby controlling the shift fork different from the target shift stage so as to be located at the neutral position.

Figure 4:
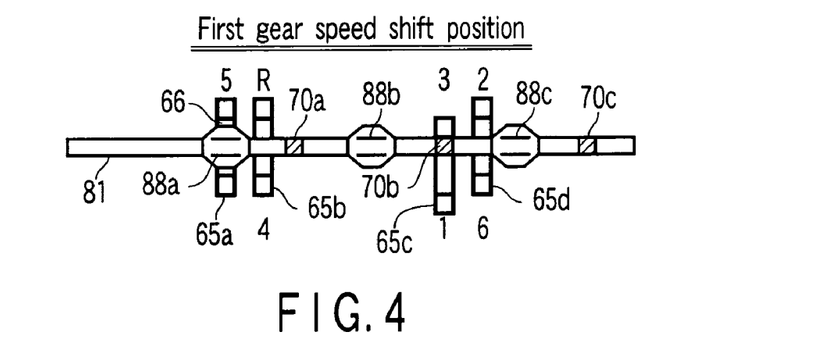
FIG. 4 is a view schematically showing the shift transmission control mechanism set at a first gear speed shift position.
Figure 5:
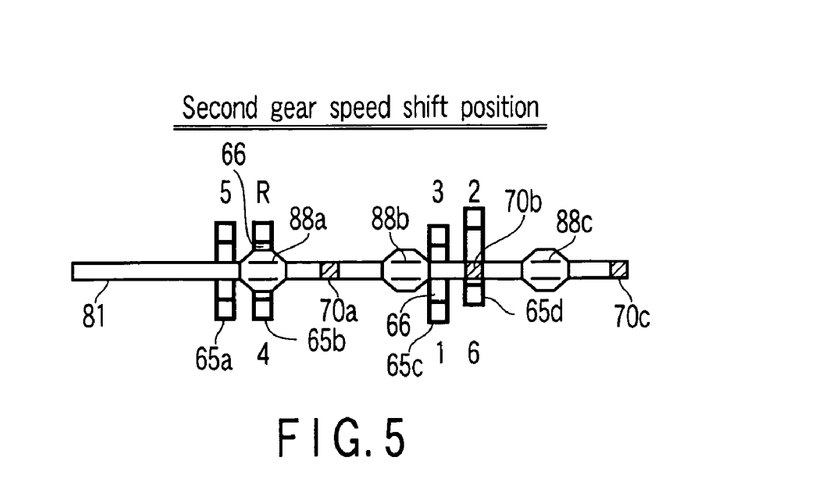
FIG. 5 is a view schematically showing the shift transmission control mechanism set at a second gear speed shift position.
Figure 6:
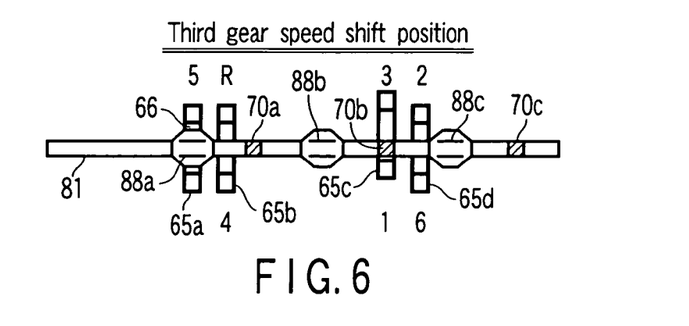
FIG. 6 is a view schematically showing the shift transmission control mechanism set at a third gear speed shift position.
Figure 7:
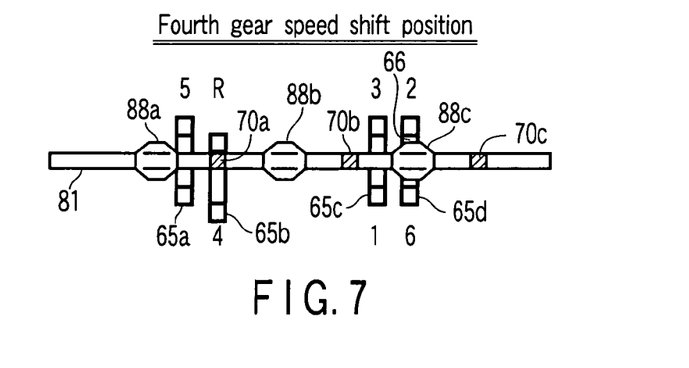
FIG. 7 is a view schematically showing the shift transmission control mechanism set at a fourth gear speed shift position.
Figure 8:
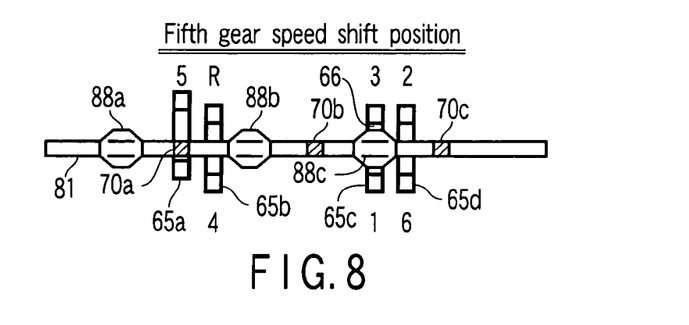
FIG. 8 is a view schematically showing the shift transmission control mechanism set at a fifth gear speed shift position.
Figure 9:
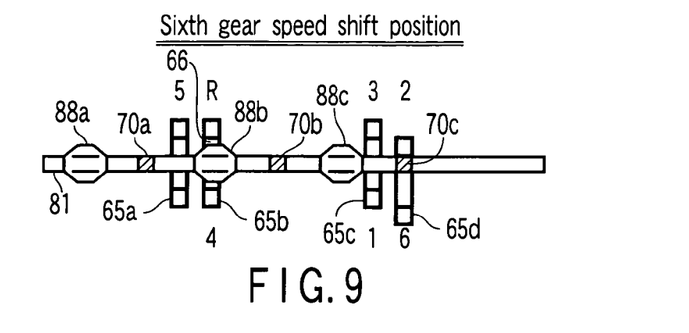
FIG. 9 is a view schematically showing the shift transmission control mechanism set at a sixth gear speed shift position.

Specifically, the positions when the shift fingers 70a to 70c shift each shift stage are determined as, for example, an N (neutral) position, and a first gear speed shift position to a sixth gear speed shift position, respectively, as shown in FIGS. 3 to 9. In consideration of these positions, the position of the lug lock portion 88a on the front end side is determined in such a manner that, when selecting the first speed and the third speed by the central shift finger 70b, for example, as shown in FIGS. 4 and 6, the lug lock portion 88a stops within the groove portion 66 of the shift lug 65a for changing the fifth speed shift, and when selecting the second speed, the lug lock portion 88a stops within the groove portion 66 of the shift lug 65b for changing an R speed (reverse) and the fourth speed shift, as shown in FIG. 5. The position of the central lug lock portion 88b is determined in such a manner that, when selecting the sixth speed by the shift finger 70c on the base end side, the lug lock portion 88b stops within the groove portion 66 of the shift lug 65b for changing the R speed and the fourth speed shift, as shown in FIG. 9. The position of the lug lock portion 88c on the base portion side is determined in such a manner that, when selecting the fourth speed by the shift finger 70a on the front end side, the lug lock portion 88c stops within the groove portion 66 of the shift lug 65d for changing the second speed shift and the sixth speed shift as shown in FIG. 7, and when selecting the fifth speed, the lug lock portion 88c stops within the groove portion 66 of the shift lug 65c for changing the first speed shift and the third speed shift, as shown in FIG. 8.

Any of these lug lock portions 88a to 88c to avoid shift transmission of the shift stage other than the target shift stage uses the structure having a tabular piece body 90 that stops within the groove portion 66 and a taper face 91 formed on the end faces on the opposite sides in the selection direction of this piece body 90. Thereby, it is possible not only to control the shift lugs 65a to 65c but also to return these shift lugs 65a to 65c to the neutral position on the taper face 91 when the shift lugs 65a to 65c are made in the shift state.

In other words, the interlock mechanism 80 is configured to avoid shift transmission of the shift stage different from the target shift stage by the lug lock portions 88a to 88c (the interlock mechanism 80) moving only in the selection direction separately from the shift fingers 70a to 70c (the shift selector mechanism 67).

On the other hand, the respective motors 75 and 87 and the clutch actuator 14 are connected to a control part 100 that is composed of a microcomputer and peripheral electron devices, for example. In this control part 100, control content necessary for various automatic transmissions (movement of the shift finger in the selection direction and movement thereof in the shift direction) is set in advance. In accordance with this control, shift transmission of the target shift stage can be carried out while controlling the shift fork different from this target shift stage at the neutral position.

The operation of an automatic transmission will be described. As a typical shift transmission, for example, shift transmission from a first speed to a second speed will be described.

Figure 10A:
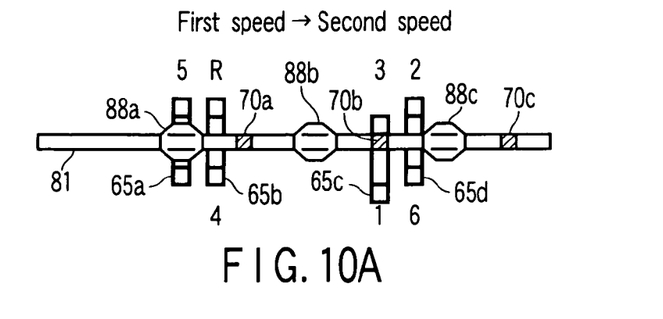
FIG. 10A is a view illustrating that the shift transmission control mechanism is shifted from the first gear speed to the second gear speed.

Here, while traveling at the first speed, as shown in FIG. 10A, the central shift finger 70b shift the shift lug 65c of the synchronous mechanism 52 (the first speed change and the third speed change) to the first speed side. In other words, at this time, the output of the engine 20 is shifted through the odd number speed transmission line to be transmitted to the input shaft 9, the driving gear 3 for the first speed, the driven gear 34 for the first speed, and the output shaft 41. In this case, the clutch 21 performs a break operation and the clutch 13 performs a connection operation.

It is assumed that a shift transmission instruction to shift the speed to the second speed is output from the control part 100 while traveling at the first speed.

When the shift transmission instruction, of which the target shift stage is the second speed, is output, the motor for selection 87 is operated so as to rotate the ball screw shaft 81. Then, the ball bearing portion 85 to be meshed with the ball screw shaft 81 is fed by the rotation of the ball screw shaft 81 so as to move the joint member 82.

The joint member 82 can be freely rotated around the selector shaft 69 in a rotational direction and is assembled so as to be controlled in an axial direction, so that the selector shaft 69 is slid in the axial direction using the shaft 71 as a guide. In this case, the fan gear 73 on the end of the selector shaft 69 slidably moves on the gear portion of the reduction gear 74a while being meshed.

Figure 10B:
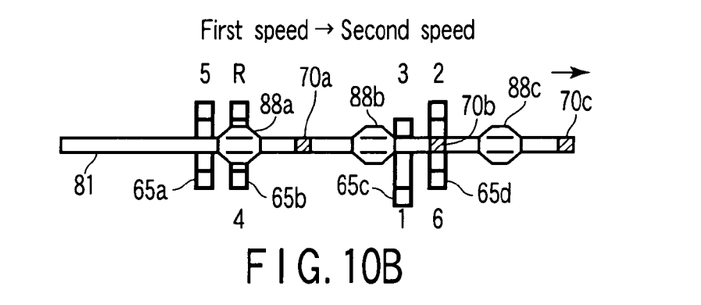
FIG. 10B is a view illustrating that the shift transmission control mechanism is shifted from the first gear speed to the second gear speed.

Based on this sliding of the selector shaft 69, as shown in FIG. 10B, the central shift finger 70b is displaced up to the shift lug 65d of the synchronous mechanism 53 for changing the second speed and the sixth speed having the target shift stage. Thereby, the shift finger 70b is engaged with the shift lug 65d and the shift fork 64d corresponding to the target shift stage is selected.

In this case, the lug lock holding member 89 is coupled to the joint member 82, so that the lug lock holding member 89 slides on the outer peripheral face of the ball screw shaft 81 with using this ball screw shaft 81 as a guide following movement of the joint member 82.

Based on this movement of the lug lock holding member 89, in order to prevent mesh in the odd number shift stage group shown in FIG. 10A, the lug lock portion 88a stopped within the groove portion 66 of the shift lug 65a for changing the fifth speed is displaced in the selection direction following the above-described movement of the shift finger 70b, and then, as shown in FIG. 10B, the lug lock portion 88a moves forward to the shift lug 65b. Then, the lug lock portion 88a is positioned within the groove portion 66 of the shift lug 65b together with termination of selection of the second speed to thereby control the shift fork 64b so as to be located in the neutral position. In this manner, the shift fork 64b for changing the R speed and the fourth speed is interlocked so as not to move in the shift direction.

Subsequently, the motor for shift 75 is operated. Then, the rotation output from the motor 75 is transmitted to the fan gear 73 via the pinion gear 76 and the reduction gear portion 74 so as to rotate the selector shaft 69.

Here, the selector shaft 69 can be freely rotated around the joint member 82. Therefore, the rotation of the selector shaft 69 is not transmitted to the joint member 82.

Figure 10C:
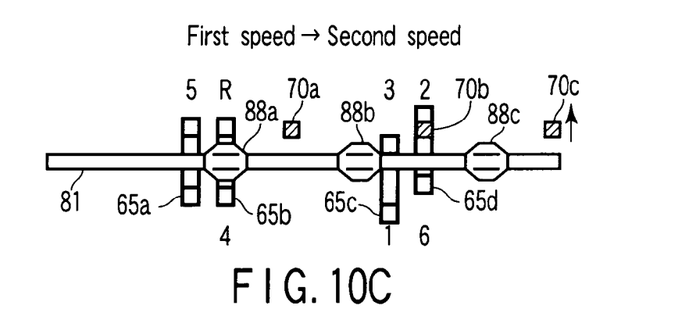
FIG. 10C is a view illustrating that the shift transmission control mechanism is shifted from the first gear speed to the second gear speed.
Figure 10D:
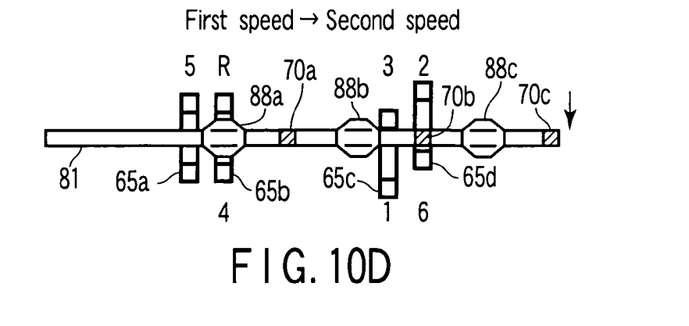
FIG. 10D is a view illustrating that the shift transmission control mechanism is shifted from the first gear speed to the second gear speed.
Figure 10E:
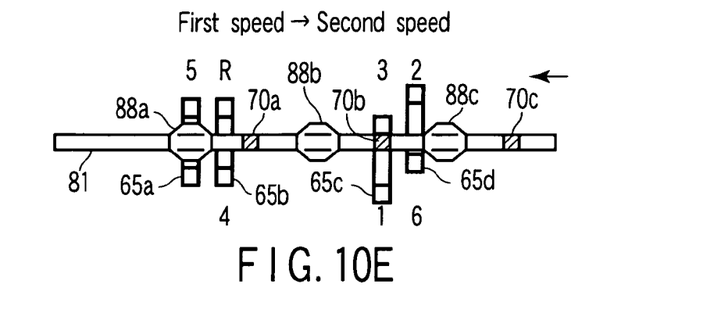
FIG. 10E is a view illustrating that the shift transmission control mechanism is shifted from the first gear speed to the second gear speed.
Figure 10F:
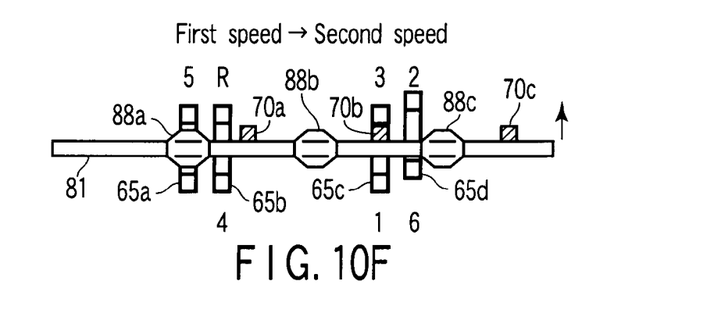
FIG. 10F is a view illustrating that the shift transmission control mechanism is shifted from the first gear speed to the second gear speed.
Figure 10G:
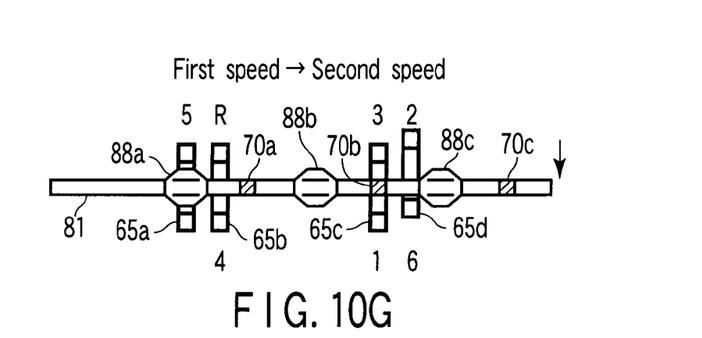
FIG. 10G is a view illustrating that the shift transmission control mechanism is shifted from the first gear speed to the second gear speed.
Figure 10H:
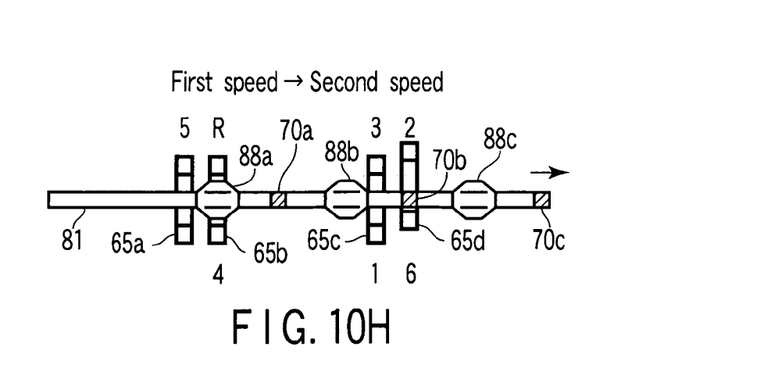
FIG. 10H is a view illustrating that the shift transmission control mechanism is shifted from the first gear speed to the second gear speed.

Thereby, the lug lock holding member 89 is not rotated and only the selector shaft 69 is rotated in the shift direction (displaced). Then, as shown in FIG. 10C, the shift finger 70b is displaced from the neutral position to the shift position of the second speed. Then, the shift fork 64d is displaced in the shift direction, and the driven gear 37 for the second speed is engaged with the output shaft 41 rotating at the current speed of the car. Thereby, the driving gear 7 of the second speed shift stage is synchronized with the speed of the car and the shift stage of the second speed is selected. Then, a shift transmission of a next stage is prepared.

After that, due to a control instruction of the control part 100, the clutch actuator 14 is controlled, and connection of the clutch 12 is carried out while releasing connection of the clutch 13. Then, a power from the engine 20 is transmitted from the input shaft 9 to the input shaft 10 while avoiding the shift transmission of the shift stage different from the target shift stage in the same even number shift stage group. Thereby, the output of the engine 20 is shifted through the even number speed transmission line to be transmitted to the input shaft 10, the driving gear 7 for the second speed, the driven gear 37 for the second speed, and the output shaft 40, and immediately, the speed of the vehicle is changed into the second speed. After that, as shown in FIGS. 10D to 10H, the shift lug 65c shifted to the first speed gear position at a previous time is returned to the neutral position by the central shift finger 70b.

In this way, shift transmission from another odd number stage to an even number stage is also carried out.

Figure 11A:
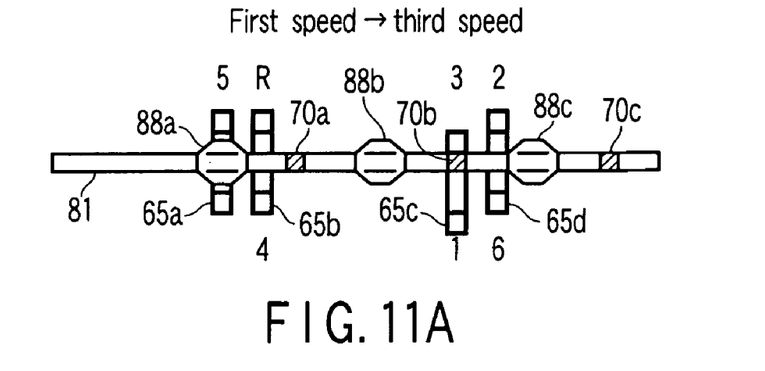
FIG. 11A is a view illustrating that the shift transmission control mechanism is shifted from the first gear speed to the third gear speed.
Figure 11B:
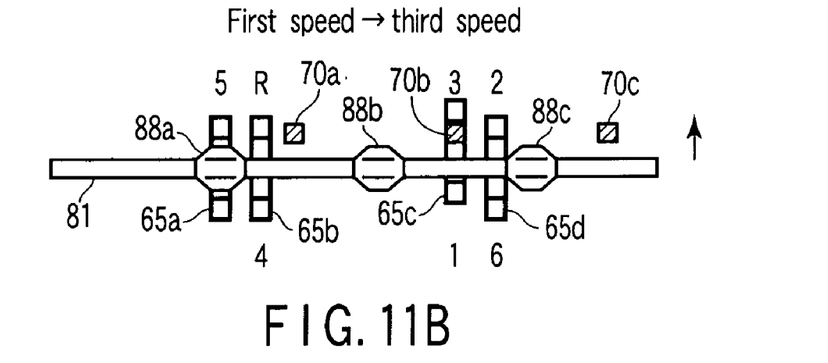
FIG. 11B is a view illustrating that the shift transmission control mechanism is shifted from the first gear speed to the third gear speed.
Figure 11C:
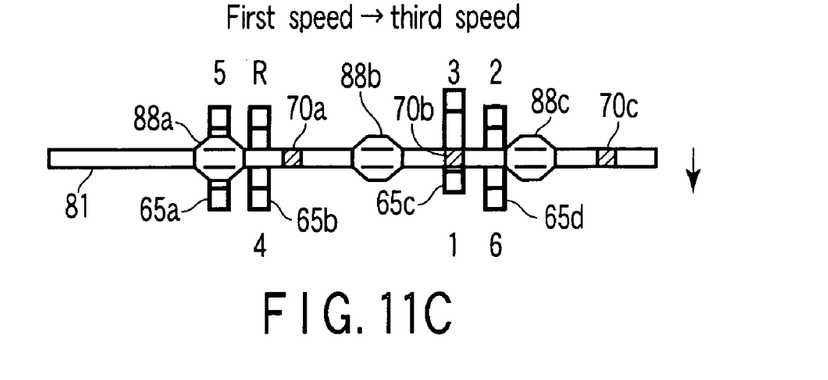
FIG. 11C is a view illustrating that the shift transmission control mechanism is shifted from the first gear speed to the third gear speed.
Figure 12A:
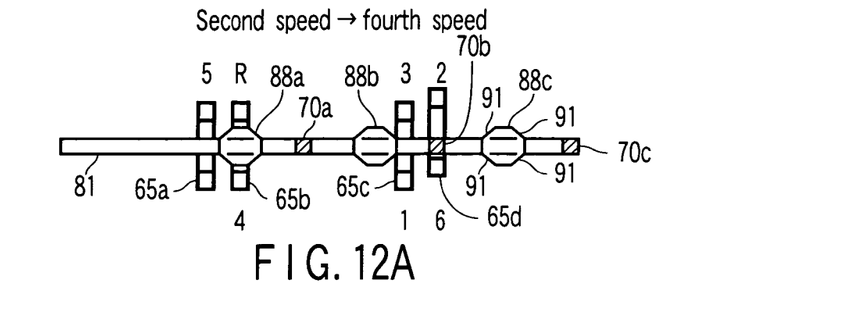
FIG. 12A is a view illustrating that the shift transmission control mechanism is shifted from the second gear speed to the fourth gear speed.
Figure 12B:
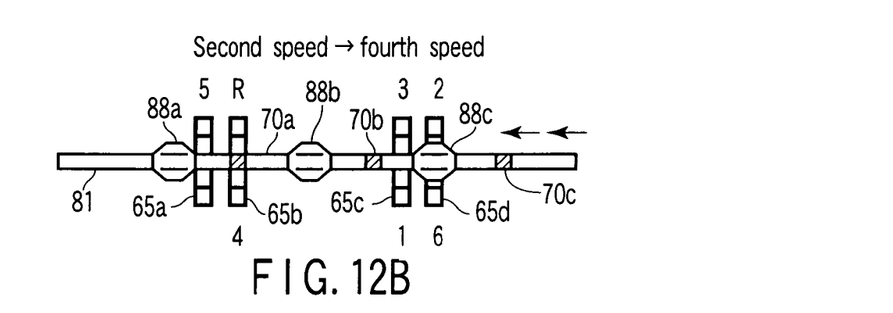
FIG. 12B is a view illustrating that the shift transmission control mechanism is shifted from the second gear speed to the fourth gear speed.
Figure 12C:
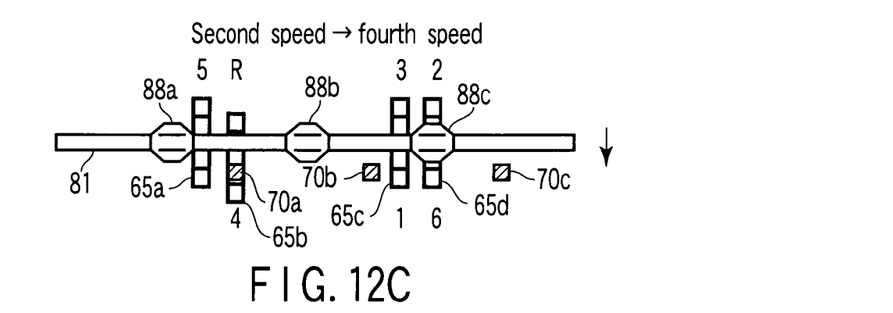
FIG. 12C is a view illustrating that the shift transmission control mechanism is shifted from the second gear speed to the fourth gear speed.
Figure 12D:
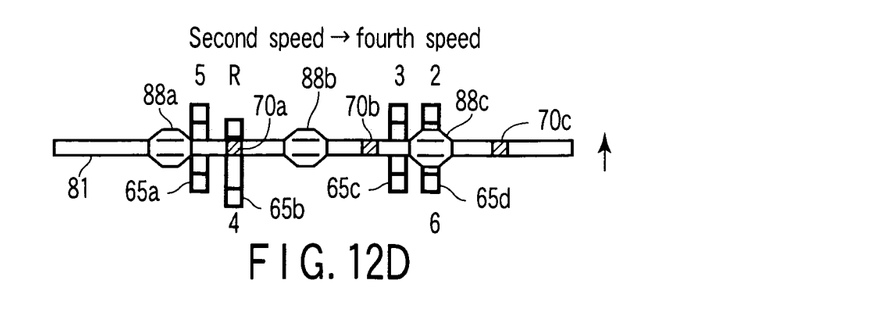
FIG. 12D is a view illustrating that the shift transmission control mechanism is shifted from the second gear speed to the fourth gear speed.

On the other hand, shift transmission in the same shift stage group, for example, shift transmission from the first speed to the third speed is carried out by shifting the shift finger 70b within the shift lug 65c for changing the first speed and the third speed to the third speed side by the operation of the motor for shift 75, for example, as shown in FIGS. 11A to 11C. The shift is carried out by the break operations of the clutches 12 and 13. In this case, the lug lock portion 88a stops within the groove portion 66 of the shift lug 65a for changing the fifth speed to continuously control the shift fork 64a corresponding to the shift lug 65a so as to be located at the neutral position. Thereby, shift transmission in the same odd number shift stage group is avoided.

Obviously, also in the shift transmission from the second speed to the fourth speed as shown in FIGS. 12A to 12D, when the shift finger 70b is disconnected from the shift lug 65d for changing the second speed and the sixth speed and the shift finger 70a moves forward to the shift lug 65b for changing the R speed and the fourth speed as the target shift stage (selection), the lug lock portion 88c moves forward to the shift lug 65d for changing the second speed and the sixth speed following the above movement. In this case, the shift lug 65d shifted to the second speed side based on the previous shift transmission is returned to the neutral position by the taper face 91 of the lug lock portion 88c. Therefore, even if a shift lug different from the target shift stage is in the shift state in the same shift stage group, the shift transmission in the same shift stage group, here, the shift transmission in the even number shift stage group is avoided.

In this way, control of the shift forks 64a to 64d of the shift stage different from the target shift stage can be carried out without being influenced by movement of the shift fingers 70a to 70c in the shift direction by using the structure to displace the lug lock portions 88a to 88c following only movement in the selection direction of the shift fingers 70a to 70c, separately from the shift selector mechanism 67 to shift and select the shift fingers 70a to 70c. Obviously, the same also applies to the shift transmission of any target shift stage (the odd number shift stage group to the even number shift stage group, the odd number shift stage group to the odd number shift stage group, and the even number shift stage group to the even number shift stage group).

Accordingly, interlock of the shift forks 64a to 64d can be carried out with a high reliability, unlike in the case of a structure integrated with a conventional shift selector mechanism. Further, the lug lock portions 88a to 88c only follow movement in the selection direction of the shift finger, so that it is not necessary to change the lug lock portions 88a to 88c even if setting of movement of the shift forks 64a to 64d in the shift direction is changed, and it is possible to easily cope with changes in the automatic transmission for different types of cars. In addition, the interlock mechanism 80 can be realized by a simple structure by using the structure in which the lug lock portions 88a to 88c are arranged on the ball screw shaft 81 elongated substantially in parallel with the selector shaft 69.

Particularly, according to the synchromesh automatic transmission 200 having the twin clutch transmission mechanism 1, for which a high neutral control is required, like the present embodiment, the interlock mechanism 80 can control the shift forks 64a to 64d to the neutral position with a high reliability solely by engaging the lug lock portions 88a to 88c with the shift lugs of the shift forks 64a to 64d that are in the same shift stage group as the target shift stage but are different from the target shift stage.

In addition, by using the tabular piece body 90 with the taper face 90, there is an advantage for the lug lock portions 88a to 88c to be made smaller and lighter and sufficiently cope with the shift lugs 65a to 65c in the shift stage.

A synchromesh automatic transmission according to a second embodiment of this invention will be described with reference to FIG. 13A to 13F. The description of the constitution having the same function as the first embodiment is omitted by representing the components by the same numbers.

According to the present invention, the lug lock portions 88a to 88c use a structure having a tubular piece body 110 and a conically-shaped face 111 formed on the end portions on the opposite sides in the selection direction of this piece body 110, and on the conically-shaped face 111, the shift lugs 65a to 65d in the shift stage are to be returned to the neutral position.

Figure 13A:
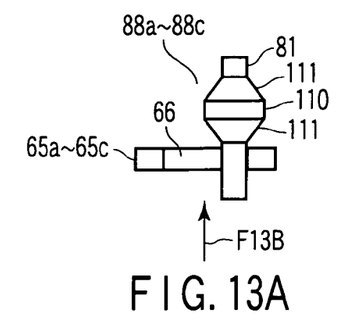
FIG. 13A is a view illustrating a lug lock portion that is a substantial part of a second embodiment according to the present invention.
Figure 13B:
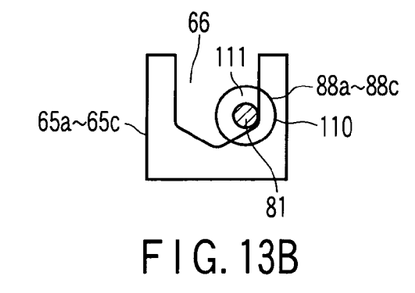
FIG. 13B is a front view showing the lug lock portions and the shift lugs shown in FIG. 13A, when viewed from an arrow F 13B in FIG. 13A.
Figure 13C:
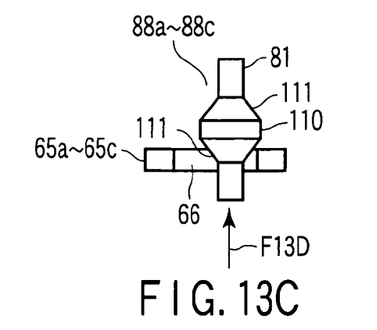
FIG. 13C is a view illustrating a lug lock portion that is a substantial part of a second embodiment according to the present invention.

In this way, by using the conically-shaped face 111, as shown in FIGS. 13A to 13C, the portion brought into contact with the shift lugs 65a to 65d is changed every second, so that durability is increased as compared with a structure to be always brought into contact with a predetermined place.

Figure 13D:
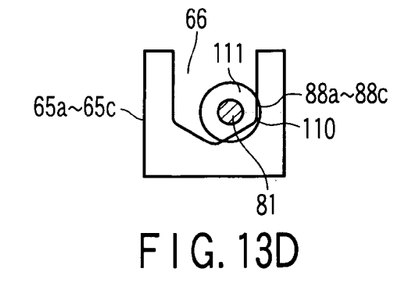
FIG. 13D is a front view showing the lug lock portions and the shift lugs shown in FIG. 13C, when viewed from an arrow F 13C in FIG. 13C.
Figure 13E:
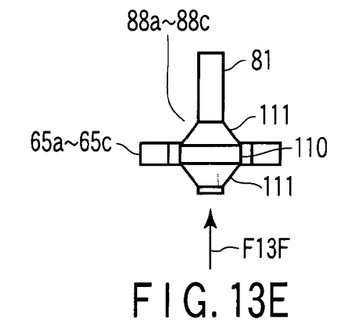
FIG. 13E is a view illustrating a lug lock portion that is a substantial part of a second embodiment according to the present invention.

FIGS. 13A, 13C, and 13E show state in which conically-shaped faces 111 bring into contact with the shift lugs 65a to 65d little by little.

FIG. 13B is a front view showing the shift lugs 65a to 65d and the lug lock portions 88a to 88c when viewed from an arrow F 13B shown in FIG. 13A.

FIG. 13D is a front view showing the shift lugs 65a to 65d and the lug lock portions 88a to 88c when viewed from an arrow F 13D shown in FIG. 13C.

Figure 13F:
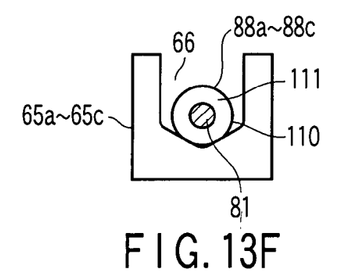
FIG. 13F is a front view showing the lug lock portions and the shift lugs shown in FIG. 13E, when viewed from an arrow F 13F in FIG. 13E.

FIG. 13F is a front view showing the shift lugs 65a to 65d and the lug lock portions 88a to 88c when viewed from an arrow F 13F shown in FIG. 13E.

The other constitution may be the same as the first embodiment.

A synchromesh automatic transmission according to a third embodiment of this invention will be described with reference to FIG. 14.

Figure 14:
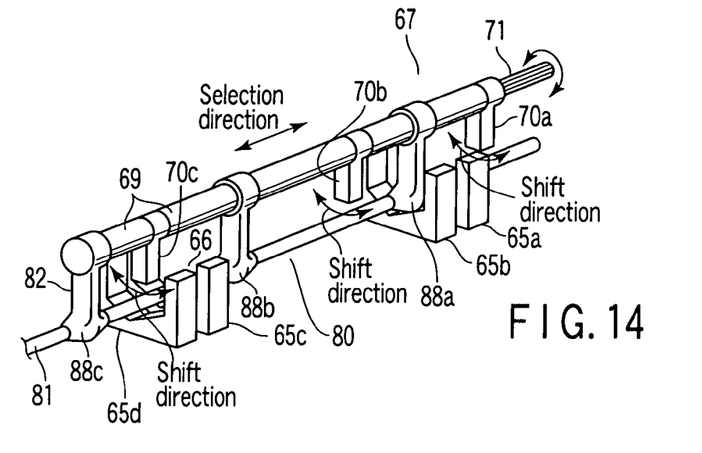
FIG. 14 is a perspective view showing a shift transmission control mechanism that is a substantial part of a third embodiment according to the present invention.

FIG. 14 shows a third embodiment of the present invention.

The present embodiment is a modified example of the interlock mechanism 80. The lug lock portions 88a to 88c in a tubular shape according to the second embodiment are meshed with the ball screw shaft 81 so as to move forward and backward, and these respective lug lock portions 88a to 88c are coupled to the selector shaft 69 by the joint member 82. Then, as in the first embodiment, the lug lock portions 88a to 88c are to be displaced following movement of the shift fingers 70a to 70c in the selection direction.

In this way, as in the first embodiment, the neutral control of the shift fork different from the target shift stage can be also carried out without being influenced by movement of the shift fingers 70a to 70c in the shift direction.

This embodiment produces the same advantages as the first and second embodiments.

Figure 15:
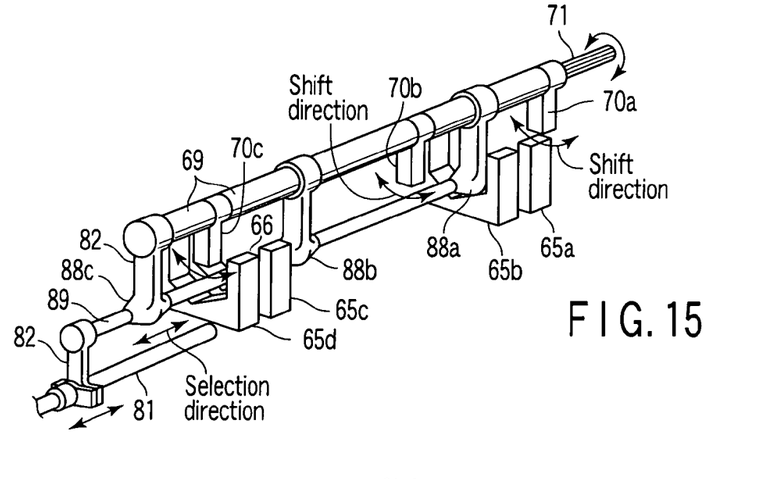
FIG. 15 is a perspective view showing a shift transmission control mechanism that is a substantial part of a fourth embodiment according to the present invention.

FIG. 15 shows a forth embodiment of the present invention.

The present embodiment is a modified example of the third embodiment. According to the present embodiment, unlike the third embodiment, the lug lock holding member 89 for supporting the lug lock portions 88a to 88c is not omitted. Instead, by supporting this holding member 89 so as to move forward and backward to and from the ball screw shaft 81 using the structure to hold the lug lock portions 88a to 88c by the axial-shaped lug lock holding member 89, the lug lock portions 88a to 88c may follow movement of the shift fingers 70a to 70c in the selection direction.

In this way, as in the first embodiment, the neutral control of the shift fork different from the target shift stage can be also carried out without being influenced by movement of the shift fingers 70a to 70c in the shift direction.

This embodiment produces the same advantages as the first and second embodiments.

Figure 16:
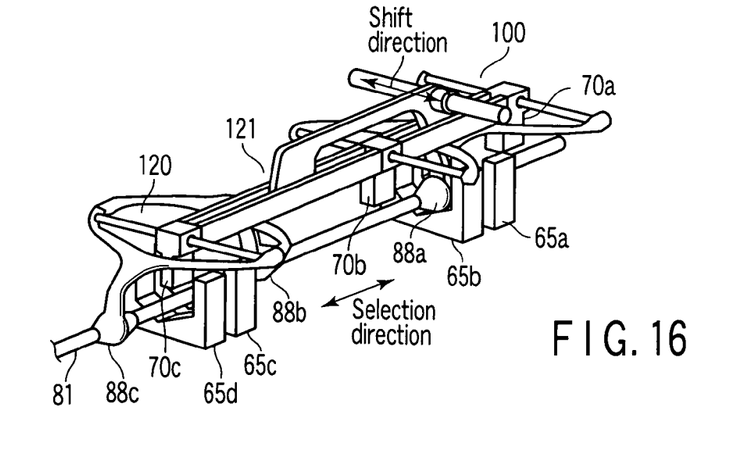
FIG. 16 is a perspective view showing a shift transmission control mechanism that is a substantial part of a fifth embodiment according to the present invention.

FIG. 16 shows a fifth embodiment of the present invention.

The present embodiment is a modified example of the third embodiment. According to the present embodiment, by supporting the shift fingers 70a to 70c so as to be slid in lateral directions by using two slider mechanisms 120 and 121, movement in the shift direction is secured from the slide displacement in the lateral directions.

This embodiment produces the same advantages as the first and second embodiments.

Figure 17:
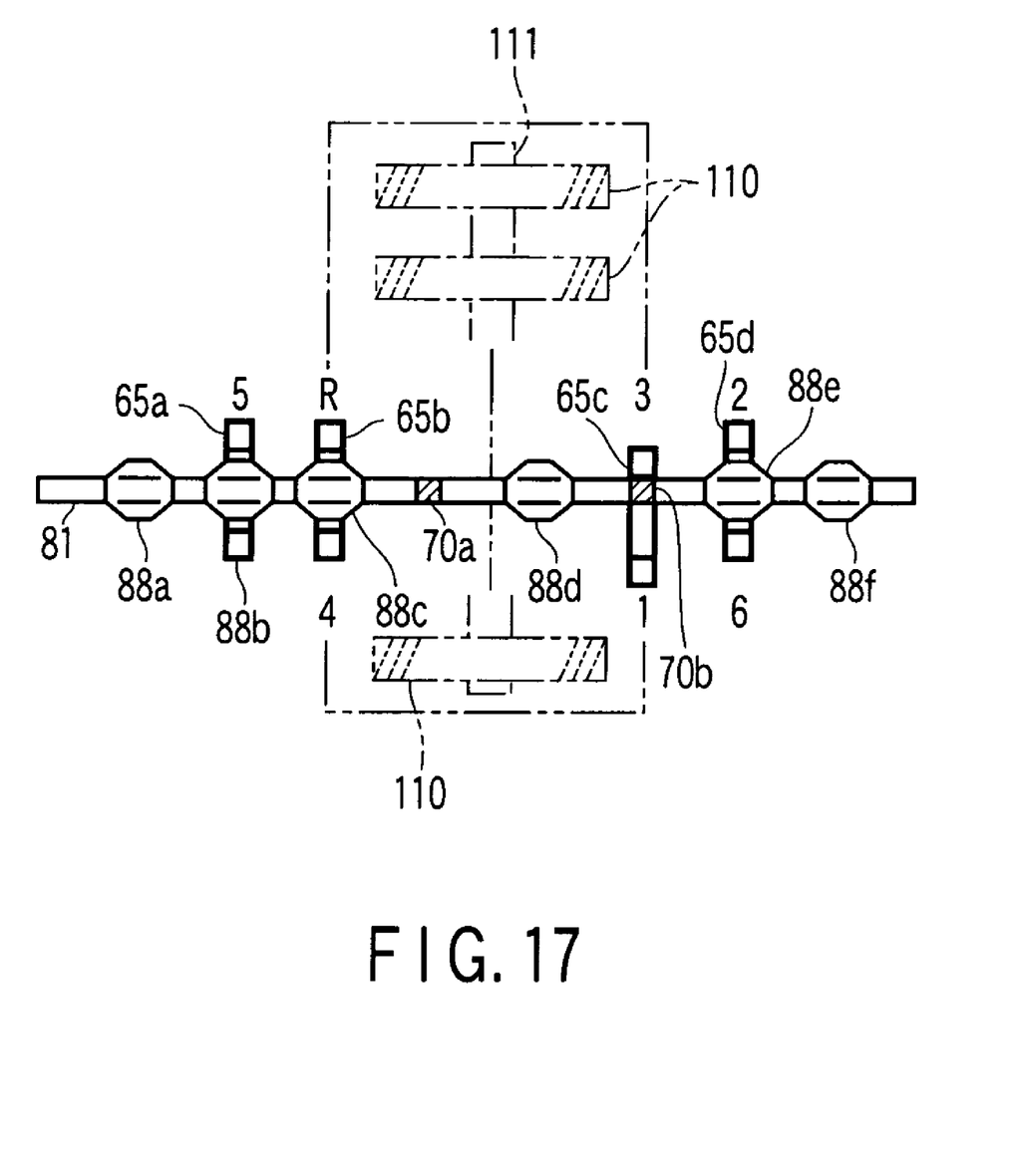
FIG. 17 is a view illustrating a substantial part of a sixth embodiment according to the present invention.

Further, in the first to fifth embodiments, examples in which the present invention is applied to the synchromesh automatic transmission having the twin clutch transmission mechanism have been described. However, without being limited to this, the present invention may be also applied to a synchromesh automatic transmission having a transmission mechanism such as a normal synchromesh transmission mechanism, like the one in the sixth embodiment as shown in FIG. 17, namely, for example, a transmission mechanism having the driving gears and driven gears 110 and the synchronous mechanisms (not illustrated) for the stage number of the shift stages arranged on the shaft member 111 in series, combining the shift forks (not illustrated) corresponding to the shift stages and the shift lugs 65a to 65d arranged in a row continued to each of the shift forks to this transmission mechanism, selecting the shift lug corresponding to the shift fork of the target shift stage according to the target shift stage based on displacement in the selection direction of the shift fingers 70a and 70b, and achieving transmission by displacing the shift lug in the shift direction of the shift fork based on displacement in the shift direction of the shift fingers 70a and 70b. In this way, the same effect as the first embodiment is brought about.

In this case, in order to have an interlock function with a high reliability, as shown in FIG. 17, the more lug lock portions than the shift lugs 65a to 65d, for example, six lug lock portions 88a to 88f are provided on the ball screw shaft 81 (the interlock shaft), and upon transmission of the target shift stage, the lug lock portions 88a to 88f may be engaged with the shift lugs 65a to 65d of all shift forks other than the target shift stage.

In FIGS. 13A to 17, the same parts as those in the first embodiment are provided with the same reference numerals and the explanation thereof is omitted.

Further, the present invention is not limited to each of the above-described embodiments and may be variously modified without departing from the sprit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A synchromesh automatic transmission comprising:
   a plurality of shift forks for changing a shift stage;
   a plurality of shift lugs which are provided to drive said each shift fork and are aligned in a row;
   a shift finger which is engaged with one of said plurality of shift lugs and displaces a corresponding shift fork to a shift position; and
   a selector shaft which is elongated along the row of the shift lugs, supports the shift finger so as to be displaced in a selection direction and enables the shift finger to be selectively engaged with one of said plurality of shift lugs,
   wherein the synchromesh automatic transmission further comprises:
   a lug lock portion which is engaged with the shift lug separately from the shift finger and enables the shift fork to be controlled so as to be located at a neutral position;
   a shift selector mechanism which achieves a target shift stage by engaging the shift finger with the shift lug of the shift fork corresponding to the target shift stage and displacing this shift fork in a shift direction; and
   an interlock mechanism which controls a shift fork that is different from the target shift stage so as to be located at a neutral position by displacing the lug lock portion following movement of the shift finger in a selection direction and engaging this lug lock portion with the shift lug of the shift fork that is different from the target shift stage.

2. The synchromesh automatic transmission according to claim 1,
   wherein the lug lock portion is arranged on an interlock shaft that is elongated substantially in parallel with the selector shaft.

3. The synchromesh automatic transmission according to claim 1,
   wherein the interlock mechanism engages the lug lock portion with the shift lugs of all shift forks other than the target shift stage.

4. The synchromesh automatic transmission according to claim 1, further comprising:
   a twin clutch transmission mechanism having driving gears of respective shift stages arranged on a plurality of input shafts that enable to selectively input power from an engine while dividing the shift stages into predetermined shift stage groups,
   wherein the interlock mechanism allows the lug lock portion to be engaged with a shift lug of a shift fork that belongs to the same group as the target shift stage but is different from the target shift stage.

5. The synchromesh automatic transmission according to claim 4, further comprising:
   a twin clutch transmission mechanism having driving gears of respective shift stages arranged on a plurality of input shafts that enable to selectively input power from an engine while dividing the shift stages into predetermined shift stage groups,
   wherein the interlock mechanism allows the lug lock portion to be engaged with the shift lugs of all shift forks that belong to the same group as the target shift stage and are other than the target shift stage.

6. The synchromesh automatic transmission according to claim 1,
   wherein the shift lugs have lug members having groove portions and these lug members are aligned in series with their groove portions facing each other, and
   the lug lock portion includes a tabular piece body which stops within the groove portion of the shift lug of the shift fork that is different from the target shift stage when the shift finger is arranged on the shift lug of the target shift stage and a taper face which is formed on end faces on the opposite sides in the selection direction of this piece body and returns the shift lug to the neutral position when the shift lug is made in a shift state.

7. The synchromesh automatic transmission according to claim 4,
   wherein the shift lugs have lug members having groove portions and these lug members are aligned in series with their groove portions facing each other, and
   the lug lock portion includes a tabular piece body which stops within the groove portion of the shift lug of the shift fork that is different from the target shift stage when the shift finger is arranged on the shift lug of the target shift stage and a taper face which is formed on end faces on the opposite sides in the selection direction of this piece body and returns the shift lug to the neutral position when the shift lug is made in a shift state.

8. The synchromesh automatic transmission according to claim 1,
   wherein the shift lugs have lug members having groove portions and these lug members are aligned in series with their groove portions facing each other, and
   the lug lock portion includes a piece body which stops within the groove portion of the shift lug of the shift fork that is different from the target shift stage when the shift finger is arranged on the shift lug of the target shift stage and a conically-shaped face which is formed on end faces on the opposite sides in the selection direction of this piece body and returns the shift lug to the neutral position when the shift lug is made in a shift state.

9. The synchromesh automatic transmission according to claim 4,
   wherein the shift lugs have lug members having groove portions and these lug members are aligned in series with their groove portions facing each other, and
   the lug lock portion includes a piece body which stops within the groove portion of the shift lug of the shift fork that is different from the target shift stage when the shift finger is arranged on the shift lug of the target shift stage and a conically-shaped face which is formed on end faces on the opposite sides in the selection direction of this piece body and returns the shift lug to the neutral position when the shift lug is made in a shift state.

* * * * *